(12) United States Patent
Owechko

(10) Patent No.: US 10,726,311 B2
(45) Date of Patent: Jul. 28, 2020

(54) INDEPENDENT COMPONENT ANALYSIS OF TENSORS FOR SENSOR DATA FUSION AND RECONSTRUCTION

(71) Applicant: HRL Laboratories, LLC, Malibu, CA (US)

(72) Inventor: Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 16/034,780

(22) Filed: Jul. 13, 2018

(65) Prior Publication Data

US 2019/0080210 A1    Mar. 14, 2019

Related U.S. Application Data

(60) Provisional application No. 62/558,094, filed on Sep. 13, 2017.

(51) Int. Cl.
*G06K 9/62* (2006.01)
*G06F 17/12* (2006.01)
*G06F 17/16* (2006.01)

(52) U.S. Cl.
CPC .......... *G06K 9/6293* (2013.01); *G06F 17/12* (2013.01); *G06F 17/16* (2013.01); *G06K 9/624* (2013.01); *G06K 9/6298* (2013.01)

(58) Field of Classification Search
CPC .... G06K 9/6293; G06K 9/624; G06K 9/6298; G06F 17/12; G06F 17/16
See application file for complete search history.

(56) References Cited

U.S. PATENT DOCUMENTS 8,204,988 B2    6/2012  Lin et al.
2011/0288379 A1*  11/2011  Wu ........................ A61B 5/02
                                                            600/301

(Continued)

FOREIGN PATENT DOCUMENTS

WO    WO2017-044082 A1    3/2017
WO    WO2017-111832 A1    6/2017

OTHER PUBLICATIONS

Acar et al., Scalable tensor factorizations for incomplete data, Chemometrics and Inteligent Laboratory Systems, 106(1) 2011, pp. 41-56.*

(Continued)

*Primary Examiner* — Catherine T. Rastovski
(74) *Attorney, Agent, or Firm* — Tope-McKay & Associates

(57) ABSTRACT

Described is a system for sensor data fusion and reconstruction. The system extracts slices from a tensor having multiple tensor modes. Each tensor mode represents a different sensor data stream of incomplete sensor signals. The tensor slices are processed into demixed outputs. The demixed outputs are converted back into tensor slices, and the tensor slices are decomposed into mode factors using matrix decomposition. Mode factors are determined for all of the tensor modes, and the mode factors are assigned to tensor factors by matching mode factors common to two or more demixings. Tensor weight factors are determined and used for fusing the sensor data streams for sensor data reconstruction. Based on the sensor data reconstruction, hidden sensor data is extracted.

16 Claims, 11 Drawing Sheets

(56) References Cited

U.S. PATENT DOCUMENTS

2015/0296214 A1 10/2015 Mahfoodh et al.
2017/0168991 A1 6/2017 Baskaran et al.

OTHER PUBLICATIONS

Cichocki et al., "Tensor decompositions for Signal Processing Applications, From two-way to multiway component analysis", IEEE Signal Processing Magazine (145) 2015.*
Vervliet et all, "Canonical polyadic decomposition", https://www.tensorlab.net/doc/cpd.html, last updated on May 9, 2017 accessed Jul. 15, 2019.*
Clifford, "Singular Value Decomposition & Independent Componenet Analysis for Blind Source Separation", Biomedical Signal and Image Processing, 2005.*
Kolda and Bader, "Tensor Decompositions and Applications", Sandia Report, Nov. 2007.*
A. Harshman in "Foundations of the PARAFAC procedure: Model and conditions for an explanatory multi-mode factor analysis," UCLA Working Papers in Phonetics, vol. 16, 1970, pp. 1-84.
Tomasi in Practical and computational aspects in chemometric data analysis, Ph.D. thesis, Department of Food Science, The Royal Veterinary and Agricultural University, Frederiksberg, Denmark, 2006, pp. 1-286.
N. Sidiropoulos et al. in "Tensor decomposition for signal processing and machine learning," IEEE Trans. on Signal Processing, vol. 65, No. 13, 2017, pp. 3551-3582.
Notification of Transmittal of International Search Report and the Written Opinion of the International Searching Authority for PCT/US2018/042008; dated Nov. 26, 2018.
International Search Report of the International Searching Authority for PCT/US2018/042008; dated Nov. 26, 2018.
Written Opinion of the International Searching Authority for PCT/US2018/042008; dated Nov. 26, 2018.
Guoxu Zhou et al., 'Linked Component Analysis From Matrices to High-Order Tensors: Applications to Biomedical Data', In: Proceedings of the IEEE, vol. 104, Issue 2, Feb. 2016.

\* cited by examiner

Frobenius Norm Error

| No. of Tensor Slices | NLS (TensorLab) | ICAT |
|---|---|---|
| 512 (Fully Sampled) | 0.057% | 0.85% |
| 256 | 0.057% | 0.67% |
| 128 | 0.057% | 0.71% |
| 64 | 0.61% | 0.92% |
| 32 | 1.6% | 1.8% |
| 16 | 2.0% | 3.9% |

FIG. 8A

Execution Time | Matlab (Sec.)

| No. of Tensor Slices | NLS (TensorLab) | ICAT |
|---|---|---|
| 512 (Fully Sampled) | 1.9 | 4.7 |
| 256 | 184 | 3.9 |
| 128 | 155 | 2.9 |
| 64 | 101 | 2.5 |
| 32 | 70 | 2.3 |
| 16 | 39 | 2.5 |

FIG. 8B

INDEPENDENT COMPONENT ANALYSIS OF TENSORS FOR SENSOR DATA FUSION AND RECONSTRUCTION

CROSS-REFERENCE TO RELATED APPLICATIONS

This is a Non-Provisional patent application of U.S. Provisional Application No. 62/558,094, filed in the United States on Sep. 13, 2017, entitled, "Independent Component Analysis of Tensors for Sensor Data Fusion and Reconstruction," the entirety of which is hereby incorporated by reference.

BACKGROUND OF INVENTION

(1) Field of Invention

The present invention relates to a system for revealing hidden structures in data and, more particularly, to a system for revealing hidden structures in data using tensor decomposition.

(2) Description of Related Art

Tensor rank decomposition is a generalization of the matrix singular value decomposition to tensors. A tensor is a generalization of matrices to higher dimensions, in other words it is a multi-dimensional table of data values. The current state-of-the-art for tensor decomposition are methods based on least squares fitting of data to the model. Examples include PARAllel FACtor analysis (PARAFAC) described by A. Harshman in "Foundations of the PARAFAC procedure: Model and conditions for an explanatory multi-mode factor analysis," UCLA Working Papers in Phonetics, Vol. 16, 1970; Nonlinear Least Squares (NLS) described by Tomasi in Practical and computational aspects in chemometric data analysis, Ph.D. thesis, Department of Food Science, The Royal Veterinary and Agricultural University, Frederiksberg, Denmark, 2006; and Alternating Least Squares (ALS), which is described by N. Sidiropoulos et al. in "Tensor decomposition for signal processing and machine learning," IEEE Trans. on Signal Processing, Vol. 65, No. 13, 2017. Each of the aforementioned references are incorporated by reference as though fully set forth herein. These methods do not scale to higher dimensional tensors and do not handle sparse data well because gradients cannot be computed accurately when the data is sparse.

Thus, a continuing need exists for a method for tensor decomposition that is efficient in terms of processing speed and memory usage.

SUMMARY OF INVENTION

The present invention relates to a system for revealing hidden structures in data and, more particularly, to a system for revealing hidden structures in data using tensor decomposition. The system comprises one or more processors and a non-transitory computer-readable medium having executable instructions encoded thereon such that when executed, the one or more processors perform multiple operations. The system extracts slices from a tensor having a plurality of tensor modes, wherein each tensor mode represents a different sensor data stream of incomplete sensor signals. The tensor slices are processed into demixed outputs. The demixed outputs are converted back into tensor slices, and the tensor slices are decomposed into mode factors using matrix decomposition. Mode factors are determined for all of the tensor modes, and the mode factors are assigned to tensor factors by matching mode factors common to two or more demixings. Using the assigned mode factors, tensor factor weight values are determined and used for combining the tensor factors for sensor data reconstruction. Based on the sensor data reconstruction, hidden sensor data is extracted, and the extracted hidden sensor data is used to control a device.

In another aspect, memory requirements of the system scale linearly with the number of tensor modes.

In another aspect, the tensor weight factors are determined by setting up a system of linear equations using sensor data and solving for the tensor weight factors.

In another aspect, mode factors are adjusted until convergence is reached.

In another aspect, the tensor slices are processed via independent component analysis (ICA).

In another aspect, the device is a component of an autonomous vehicle.

In another aspect, the device comprises a display, and wherein the display presents instructions for at least one action for the user to perform.

Finally, the present invention also includes a computer program product and a computer implemented method. The computer program product includes computer-readable instructions stored on a non-transitory computer-readable medium that are executable by a computer having one or more processors, such that upon execution of the instructions, the one or more processors perform the operations listed herein. Alternatively, the computer implemented method includes an act of causing a computer to execute such instructions and perform the resulting operations.

BRIEF DESCRIPTION OF THE DRAWINGS

The objects, features and advantages of the present invention will be apparent from the following detailed descriptions of the various aspects of the invention in conjunction with reference to the following drawings, where:

FIG. 8A is a table illustrating tensor reconstruction error in terms of the Frobenius norm, comparing ICAT reconstruction versus the NLS algorithm according to some embodiments of the present disclosure;

FIG. 8B is a table illustrating execution time, comparing ICAT reconstruction versus the NLS algorithm according to some embodiments of the present disclosure;

DETAILED DESCRIPTION

Figure 1:
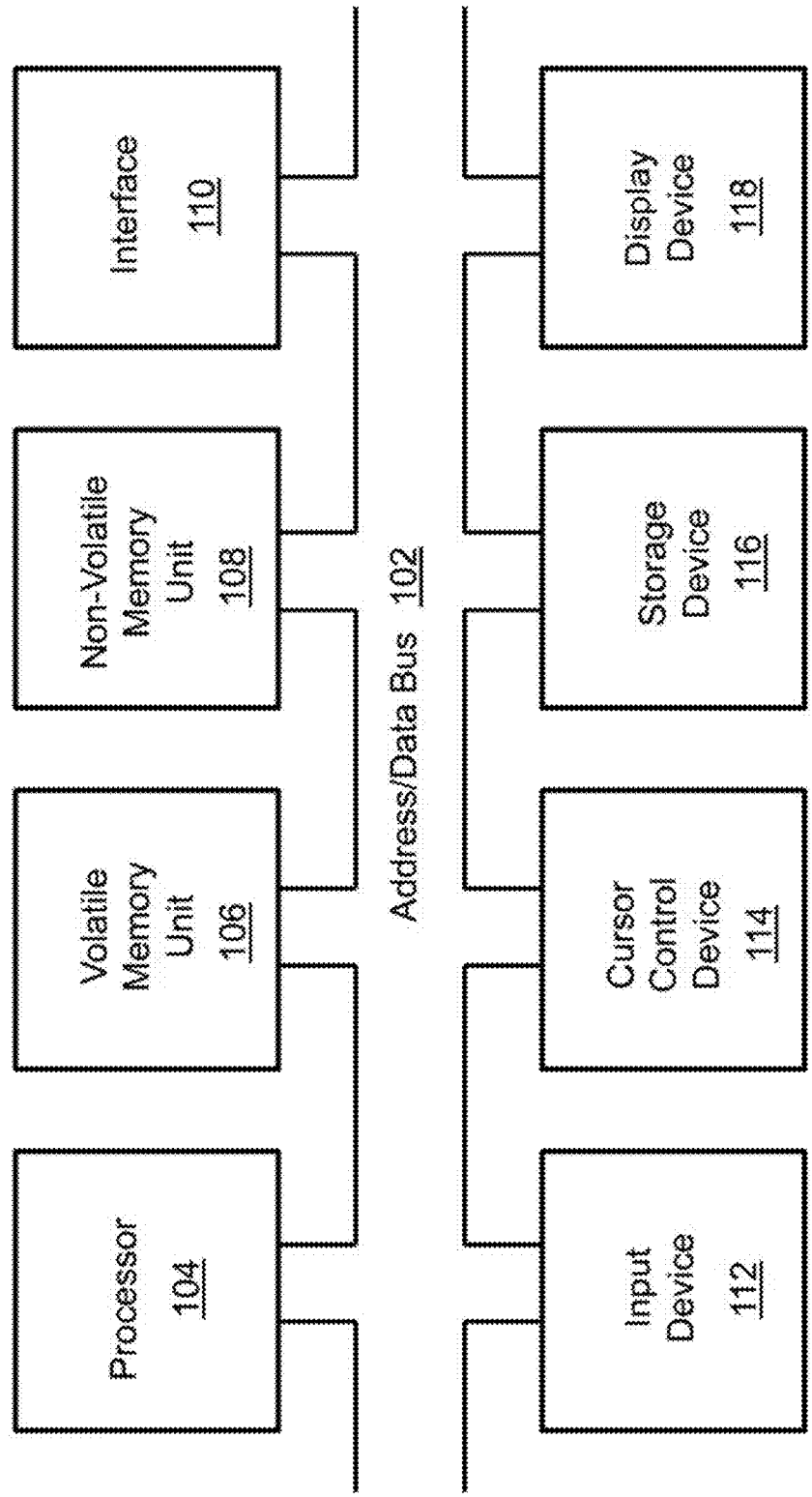
FIG. 1 is a block diagram depicting the components of a system for revealing hidden structures in data according to some embodiments of the present disclosure.

The present invention relates to a system for revealing hidden structures in data and, more particularly, to a system for revealing hidden structures in data using tensor decomposition. The following description is presented to enable one of ordinary skill in the art to make and use the invention and to incorporate it in the context of particular applications. Various modifications, as well as a variety of uses in different applications will be readily apparent to those skilled in the art, and the general principles defined herein may be applied to a wide range of aspects. Thus, the present invention is not intended to be limited to the aspects presented, but is to be accorded the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

(1) Principal Aspects

Various embodiments of the invention include three "principal" aspects. The first is a system for revealing hidden structures in data. The system is typically in the form of a computer system operating software or in the form of a "hard-coded" instruction set. This system may be incorporated into a wide variety of devices that provide different functionalities. The second principal aspect is a method, typically in the form of software, operated using a data processing system (computer). The third principal aspect is a computer program product. The computer program product generally represents computer-readable instructions stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories. These aspects will be described in more detail below.

A block diagram depicting an example of a system (i.e., computer system 100) of the present invention is provided in FIG. 1. The computer system 100 is configured to perform calculations, processes, operations, and/or functions associated with a program or algorithm. In one aspect, certain processes and steps discussed herein are realized as a series of instructions (e.g., software program) that reside within computer readable memory units and are executed by one or more processors of the computer system 100. When executed, the instructions cause the computer system 100 to perform specific actions and exhibit specific behavior, such as described herein.

The computer system 100 may include an address/data bus 102 that is configured to communicate information. Additionally, one or more data processing units, such as a processor 104 (or processors), are coupled with the address/data bus 102. The processor 104 is configured to process information and instructions. In an aspect, the processor 104 is a microprocessor. Alternatively, the processor 104 may be a different type of processor such as a parallel processor, application-specific integrated circuit (ASIC), programmable logic array (PLA), complex programmable logic device (CPLD), or a field programmable gate array (FPGA).

The computer system 100 is configured to utilize one or more data storage units. The computer system 100 may include a volatile memory unit 106 (e.g., random access memory ("RAM"), static RAM, dynamic RAM, etc.) coupled with the address/data bus 102, wherein a volatile memory unit 106 is configured to store information and instructions for the processor 104. The computer system 100 further may include a non-volatile memory unit 108 (e.g., read-only memory ("ROM"), programmable ROM ("PROM"), erasable programmable ROM ("EPROM"), electrically erasable programmable ROM "EEPROM"), flash memory, etc.) coupled with the address/data bus 102, wherein the non-volatile memory unit 108 is configured to store static information and instructions for the processor 104. Alternatively, the computer system 100 may execute instructions retrieved from an online data storage unit such as in "Cloud" computing. In an aspect, the computer system 100 also may include one or more interfaces, such as an interface 110, coupled with the address/data bus 102. The one or more interfaces are configured to enable the computer system 100 to interface with other electronic devices and computer systems. The communication interfaces implemented by the one or more interfaces may include wireline (e.g., serial cables, modems, network adaptors, etc.) and/or wireless (e.g., wireless modems, wireless network adaptors, etc.) communication technology.

In one aspect, the computer system 100 may include an input device 112 coupled with the address/data bus 102, wherein the input device 112 is configured to communicate information and command selections to the processor 100. In accordance with one aspect, the input device 112 is an alphanumeric input device, such as a keyboard, that may include alphanumeric and/or function keys. Alternatively, the input device 112 may be an input device other than an alphanumeric input device. In an aspect, the computer system 100 may include a cursor control device 114 coupled with the address/data bus 102, wherein the cursor control device 114 is configured to communicate user input information and/or command selections to the processor 100. In an aspect, the cursor control device 114 is implemented using a device such as a mouse, a track-ball, a track-pad, an optical tracking device, or a touch screen. The foregoing notwithstanding, in an aspect, the cursor control device 114 is directed and/or activated via input from the input device 112, such as in response to the use of special keys and key sequence commands associated with the input device 112. In an alternative aspect, the cursor control device 114 is configured to be directed or guided by voice commands.

In an aspect, the computer system 100 further may include one or more optional computer usable data storage devices, such as a storage device 116, coupled with the address/data bus 102. The storage device 116 is configured to store information and/or computer executable instructions. In one aspect, the storage device 116 is a storage device such as a magnetic or optical disk drive (e.g., hard disk drive ("HDD"), floppy diskette, compact disk read only memory ("CD-ROM"), digital versatile disk ("DVD")). Pursuant to one aspect, a display device 118 is coupled with the address/data bus 102, wherein the display device 118 is configured to display video and/or graphics. In an aspect, the display device 118 may include a cathode ray tube ("CRT"), liquid crystal display ("LCD"), field emission display ("FED"), plasma display, or any other display device suitable for displaying video and/or graphic images and alphanumeric characters recognizable to a user.

The computer system 100 presented herein is an example computing environment in accordance with an aspect. However, the non-limiting example of the computer system 100 is not strictly limited to being a computer system. For example, an aspect provides that the computer system 100 represents a type of data processing analysis that may be used in accordance with various aspects described herein. Moreover, other computing systems may also be implemented. Indeed, the spirit and scope of the present technology is not limited to any single data processing environment. Thus, in an aspect, one or more operations of various aspects of the present technology are controlled or implemented using computer-executable instructions, such as program modules, being executed by a computer. In one implementation, such program modules include routines, programs, objects, components and/or data structures that are configured to perform particular tasks or implement particular abstract data types. In addition, an aspect provides that one or more aspects of the present technology are implemented by utilizing one or more distributed computing environments, such as where tasks are performed by remote processing devices that are linked through a communications network, or such as where various program modules are located in both local and remote computer-storage media including memory-storage devices.

Figure 2:
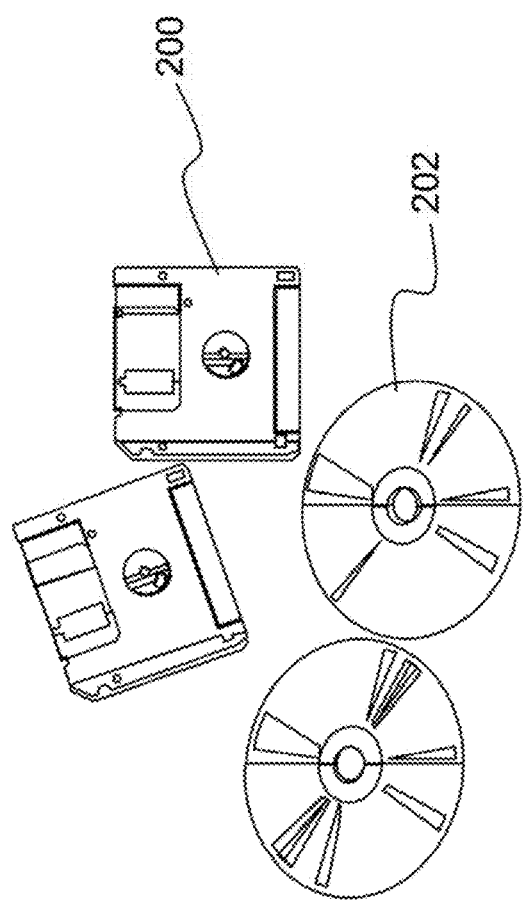
FIG. 2 is an illustration of a computer program product according to some embodiments of the present disclosure.

An illustrative diagram of a computer program product (i.e., storage device) embodying the present invention is depicted in FIG. 2. The computer program product is depicted as floppy disk 200 or an optical disk 202 such as a CD or DVD. However, as mentioned previously, the computer program product generally represents computer-readable instructions stored on any compatible non-transitory computer-readable medium. The term "instructions" as used with respect to this invention generally indicates a set of operations to be performed on a computer, and may represent pieces of a whole program or individual, separable, software modules. Non-limiting examples of "instruction" include computer program code (source or object code) and "hard-coded" electronics (i.e. computer operations coded into a computer chip). The "instruction" is stored on any non-transitory computer-readable medium, such as in the memory of a computer or on a floppy disk, a CD-ROM, and a flash drive. In either event, the instructions are encoded on a non-transitory computer-readable medium.

(2) Specific Details of Various Embodiments

This disclosure provides Independent Component Analysis of Tensors (ICAT). ICAT is a processing method for tensors with applications in sensor data fusion and reconstruction. A tensor is a generalization of matrices to higher dimensions, in other words it is a multi-dimensional table of data values. ICAT is a unique method for decomposing a tensor into a sum of simpler component tensors that reveal hidden patterns in the data.

As will be described in detail below, ICAT is very efficient in terms of processing speed and memory usage, which provides a dramatic improvement in computational efficiency over existing techniques and processes. The processing speed is faster than existing methods because it does not need to solve an alternating least-squares fitting problem over the entire tensor as current methods do. ICAT is also more memory efficient because the entire tensor doesn't need to fit in memory. The memory requirements scale linearly with the number of tensor dimensions instead of exponentially which makes processing of tensors with more than three dimensions practical. These properties enable ICAT to perform efficient fusion and reconstruction of multiple sensor data streams if each dimension of the tensor is used to represent a different sensor. For example, ICAT can be used to analyze the combined outputs of gas chromatography and mass spectrometer sensors for detection of chemical substances. Alternatively, ICAT can be utilized in analysis of hyperspectral data in spatial, spectral, and temporal dimensions for detection of materials, objects, and events.

An important requirement for sensing systems involving multiple sensors is the ability to extract weak signals from mixtures with other ambient signals and fill in missing data. The invention described herein helps to meet this requirement using a sensor fusion framework based on modeling the relationships between sensor signals and different contexts using a tensor representation. The system according to embodiments of the present disclosure analyzes the tensor using a unique Independent Component Analysis of Tensors (ICAT) tensor decomposition method described in more detail below. The dimensions (or modes) of the tensor are used to represent both sensor data and contextual conditions such as time-of-day, geographic location, signals from other sensors, and so on. The tensor element values represent the relationships between signals and contexts. Tensor decomposition can then reveal the hidden structure in the relationships which, in turn, can be used to extract weak signals and predict or fill-in missing sensor data.

Tensor decomposition has been used successfully in many applications involving multi-dimensional data, such as in movie recommendation systems (e.g., the Netflix™ challenge), other sensor fusion applications, chemometrics, and social network activity analysis, among others. The Netflix™ challenge is a public challenge and associated dataset for researchers to develop algorithms for recommending movie titles to users based on their previous movie rentals and the properties of movies, such as the topic area, production year, type of movie, etc. Such datasets are naturally represented by multi-dimensional tensors. Decomposing the tensor can reveal hidden user preferences that can be used to recommend movies to the user.

Experimental studies (described below) have verified that ICAT speeds up tensor composition by more than fifty times (i.e., >50×), scales linearly with tensor order instead of exponentially, and is more accurate for sub-sampled and sparse data compared to state-of-the-art methods. This makes ICAT ideal for real-time context-based processing of noisy and incomplete signals from sensors.

Figure 3A:
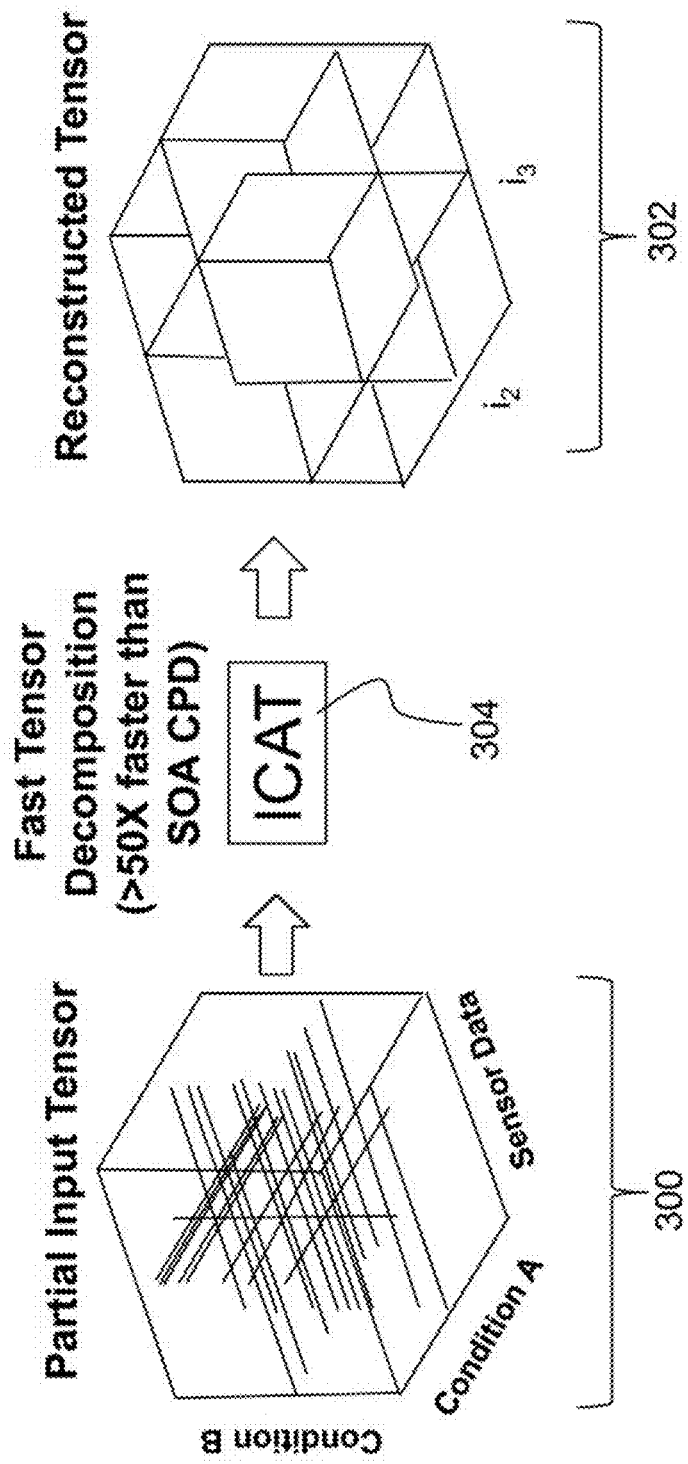
FIG. 3A is an illustration of conversion of partial input tensor data to reconstructed tensor data according to some embodiments of the present disclosure.
Figures 3B, 3C:
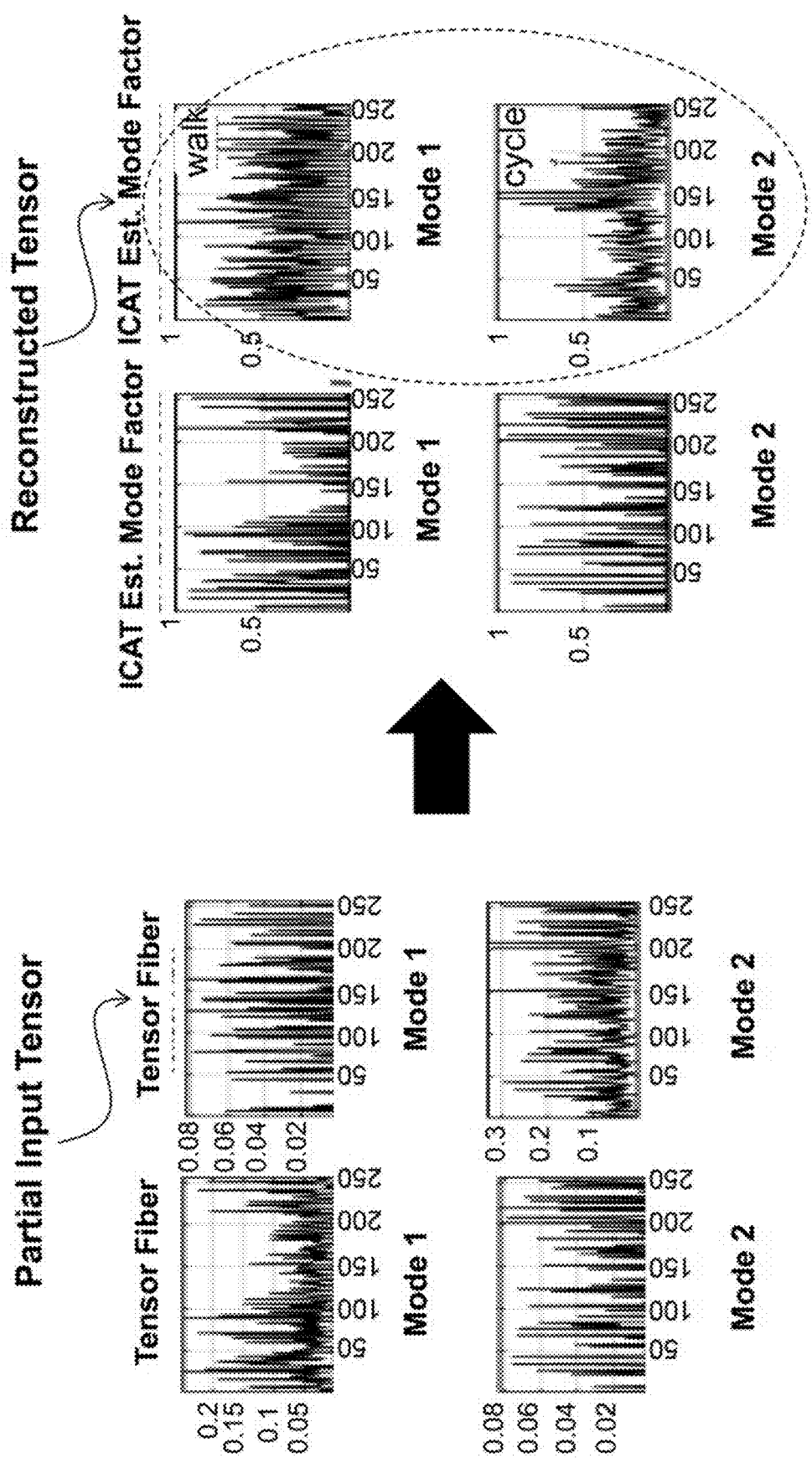
FIG. 3B is an illustration of partial input tensor data according to some embodiments of the present disclosure.
FIG. 3C is an illustration of reconstructed tensor data according to some embodiments of the present disclosure.

FIGS. 3A-3C depict a demonstration of ICAT context-based sensor data reconstruction and extraction of walking and cycling signals from interference using the AReM human activity dataset collected using RF sensors worn by human subjects. FIG. 3A shows various slices of the 3D subsampled partial input tensor data 300 and reconstructed output tensors 302 generated from ICAT 304 according to embodiments of the present disclosure. In FIG. 3A, partial input tensor data 300 consists of tensor slices (mixtures) of signals collected under various conditions. Various combinations of conditions define different contexts for sensor processing. For this dataset, the various conditions were the different environments in which the human subjects performed the various activities.

FIGS. 3B and 3C depict activity data extracted (FIG. 3B) and reconstructed (FIG. 3C) from partial input tensor data 300 using the ICAT 304 described herein with 99% accuracy and 89% missing data in this example using the human activity recognition and modeling (AREM) dataset. ICAT 304 was able to reconstruct the tensor with 89% of the tensor missing and separate walking human detection signals and cycling human detection signals from interference with 1% error in the signal reconstruction and a Matlab execution time of 1.73 seconds (sec) compared to 105 seconds for the state-of-the-art (SOA) nonlinear least-squares (NLS) algorithm. ICAT 304 was also tested using synthetic data as described in more detail below. The reconstruction error was as low as 0.67% with an execution time that was forty-seven times (i.e., 47×) faster than the NLS algorithm.

Existing SOA tensor decomposition methods operate by fitting multi-linear models to the measured data using a mean-squared-error fitting metric and some form of gradient descent, such as NLS. The ICAT method is the first to decompose tensors using a completely different metric based on maximizing the statistical independence of the tensor mode factors. Using independent component analysis (ICA) enables ICAT to extract weak signals in interference since, unlike least-square error measures, statistical independence measures are insensitive to the relative amplitudes of signal components. ICAT is also much faster than the SOA because the small relative effects of weak signals on gradients slows down the SOA methods. The fact that it is non-iterative also reduces the computation time. ICAT has greatly reduced memory requirements because only the measured part of the tensor, not the full tensor, needs to be represented during computations. This is because ICAT calculates the tensor mode factor vectors directly from the measured data without loading the full tensor into memory before operating on it, as SOA methods do.

ICA has not been used for tensor decomposition before because the permutation ambiguity of ICA outputs mixes up the tensor mode components and finding the correct sequence has a complexity that scales exponentially with tensor order. ICAT solves this issue by using a unique mode-by-mode chain demixing method that efficiently resolves the permutation ambiguity and scales linearly with tensor order.

Figure 4:
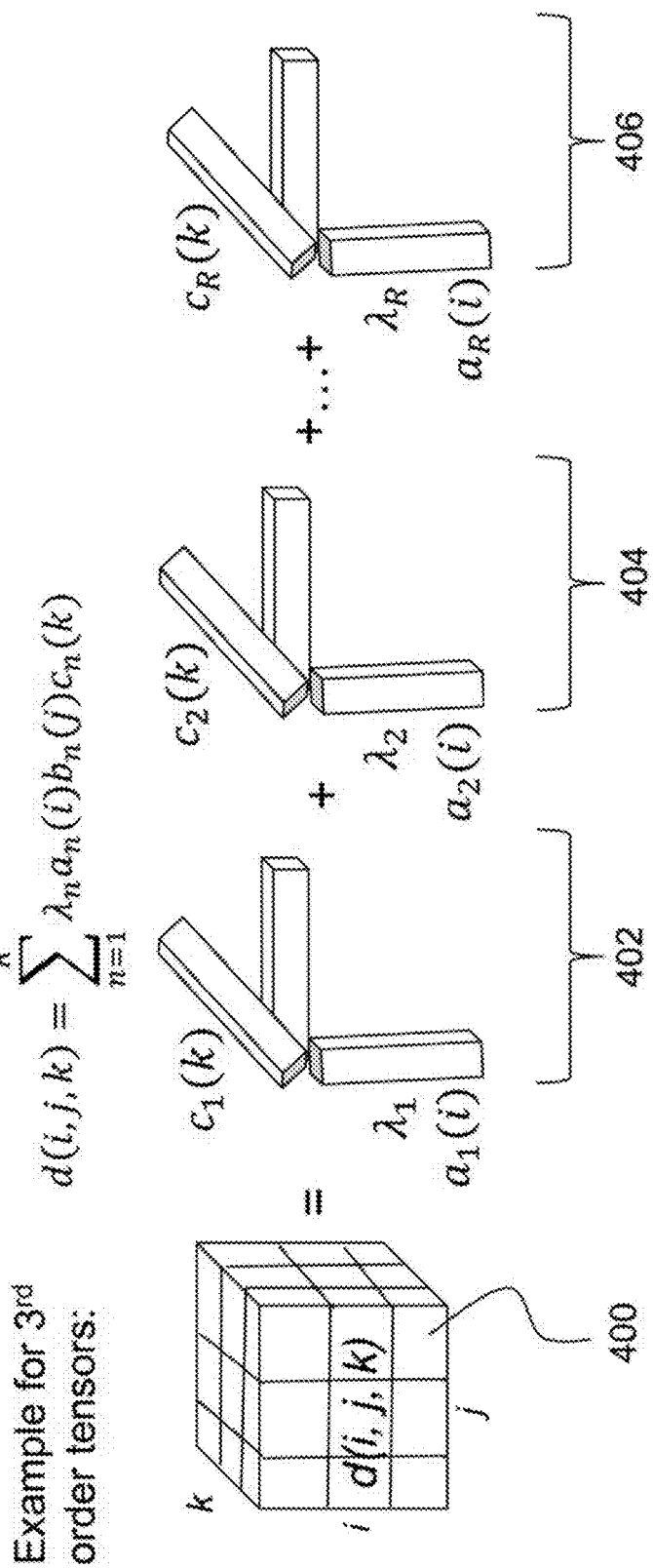
FIG. 4 is an illustration of canonical polyadic decomposition (CPD) of tensors into factors according to some embodiments of the present disclosure.

ICAT is based on the standard canonical polyadic decomposition (CPD) form of tensor decomposition shown in FIG. 4. The invention described herein is a new way to calculate the CPD. CPD of tensors into factors reveals structure in tensors which ICAT uses for denoising, data completion, and signal extraction. In analogy to SVD (single value decomposition) of matrices, CPD decomposes a tensor 400 into a weighted sum of R tensor factors 402, 404, and 406, each of which is given by an outer product of D tensor mode factors or vectors, where D is the tensor order and R is the rank of the tensor. A smaller R indicates more structure in the data since the CPD representation has only RDN parameters compared to $N^D$ parameters for a D-order tensor with N elements per mode. If some mild conditions on the tensor are met, the decomposition is guaranteed to be unique, which is not the case for matrix decompositions. Therefore, if different methods are used to decompose the tensor and the resulting reconstruction errors are low, then the decompositions will be the same for all the methods.

Figure 5:
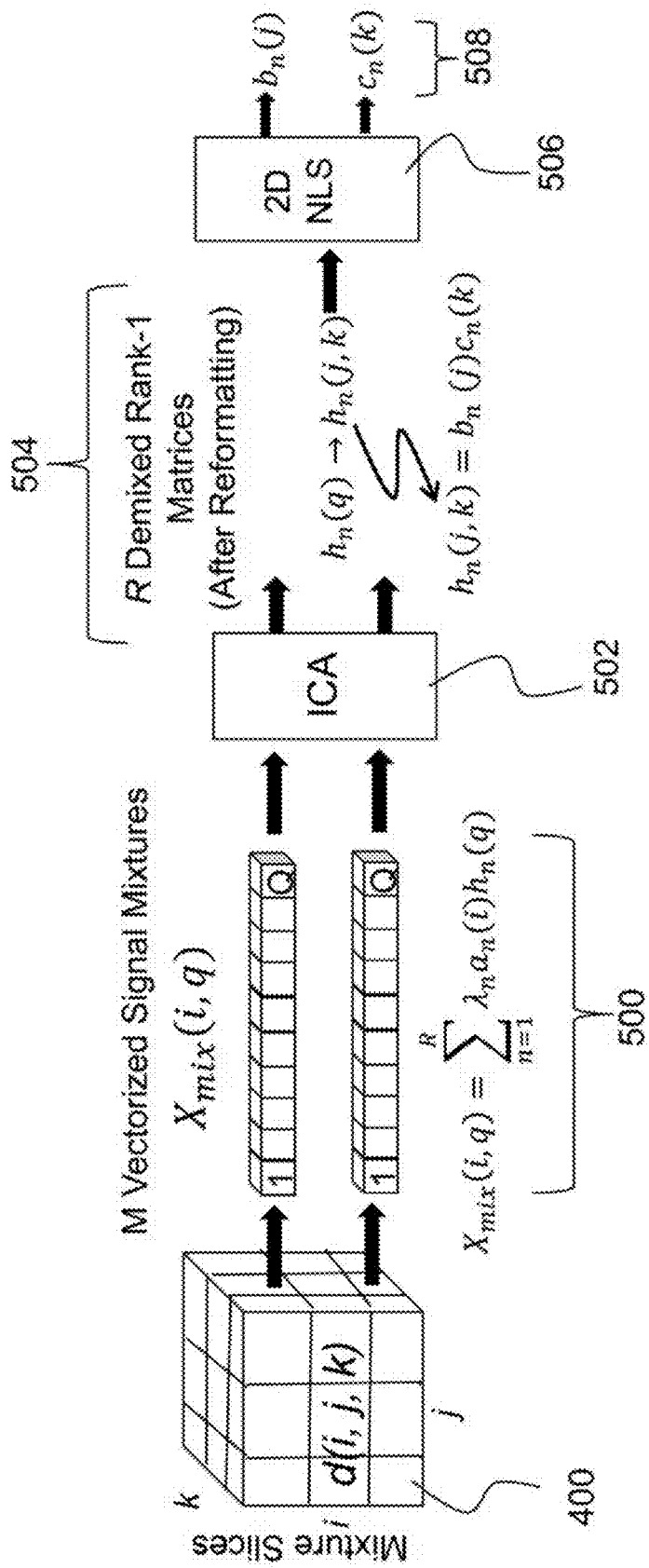
FIG. 5 is an illustration of Step 1 of the independent component analysis of tensors (ICAT) algorithm extracting tensor mode factors according to some embodiments of the present disclosure.

Unlike the SOA methods, ICAT uses statistical independence to decompose tensors. It consists of the two main steps shown in FIGS. 5 and 6 using a tensor with three modes for ease of illustration. Step 1 of the ICAT algorithm extracts the tensor mode factors. In this example for a third-order tensor (element 400 in FIG. 5), two-dimensional (2D) horizontal slices in the second and third modes of the tensor are vectorized (i.e., converted into one-dimension (1D) vectors, element 500) and used as signal mixture inputs to ICA (element 502). Each of the R demixed outputs of ICA is then converted back to a 2D slice format. The n-th output of ICA is then a rank-1 matrix (element 504) that is the outer-product of the factors for tensor mode n. A conventional least-squares algorithm, such as NLS (element 506), is used to separate each rank-1 output matrix into factors for the second and third modes ($b_n$ and $c_n$). The ICA outputs are processed using NLS to determine the $b_n(j)$ and $c_n(k)$ mode factors (element 508). These two mode factors (element 508) are automatically correctly assigned to tensor factors, because they were both part of the same demixing operation. The above flow is repeated using vertical mixture slices to extract the $a_n(i)$ and $c_n(k)$ mode factors.

Now one is left with determining the factors for the first mode ($a_n$). The first and third mode factors can be determined in the same way as before but by using vertical instead of horizontal slices of the tensor as mixture inputs to ICA. However, since the ordering of ICA outputs is indeterminate, and the factors for the first mode were determined in a separate demixing operation, there is still a need to assign the demixed first mode factors $a_n$ to the correct tensor factor. The naïve approach is to search for the best ordering of the $a_n$ mode factors that minimizes the reconstruction error, but this would involve R! comparisons, which quickly explodes and does not scale well with increasing rank R.

Figure 6:
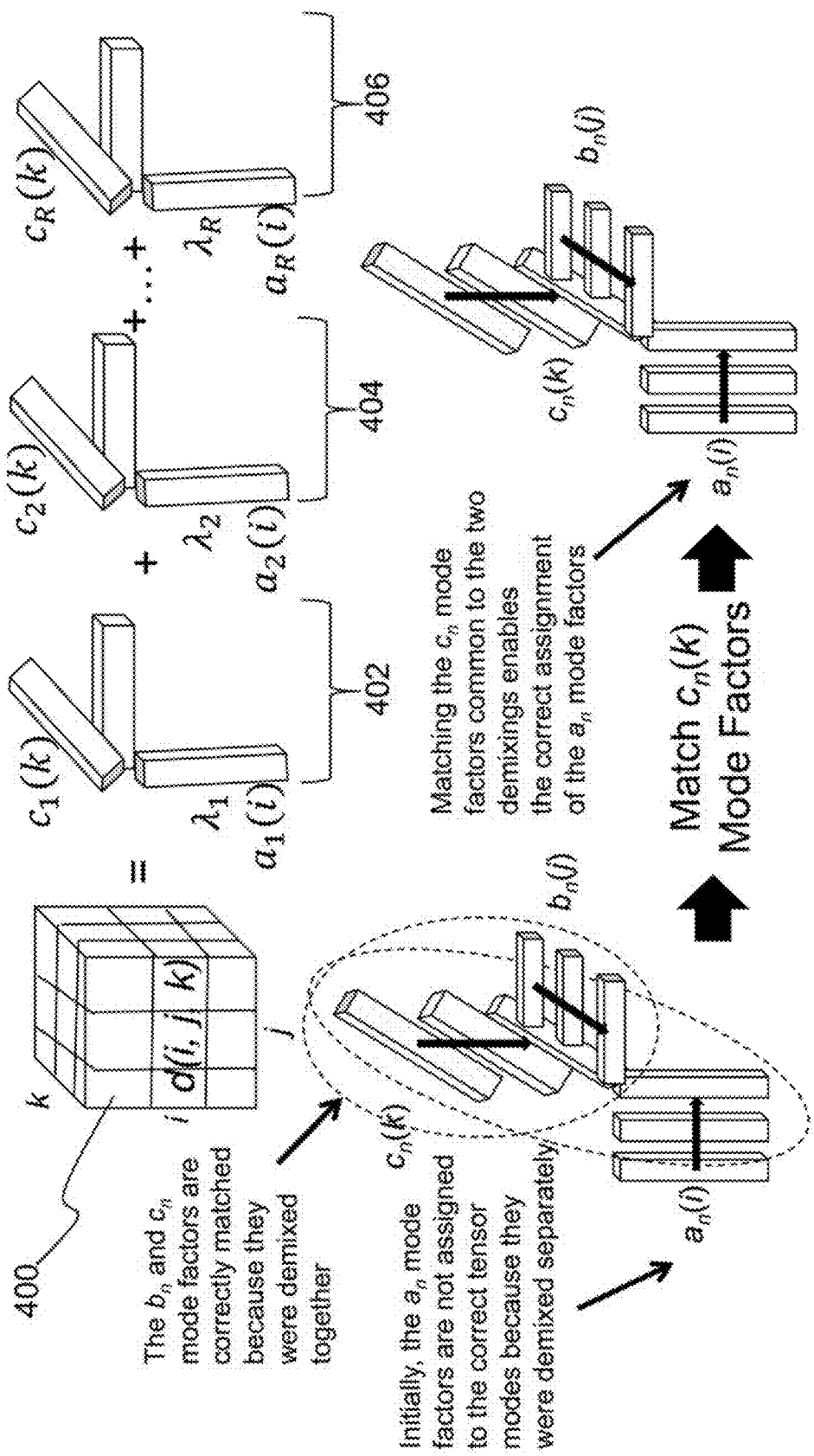
FIG. 6 is an illustration of Step 2 of the ICAT algorithm resolves the independent component analysis (ICA) permutation ambiguity, assigns the mode factors to the correct tensor factors, and calculates the tensor factor weights according to some embodiments of the present disclosure.

Instead, the system according to embodiments of the present disclosure uses the method shown in FIG. 6 to assign the $a_n$ mode factors to the correct tensor factors. Step 2 of the ICAT algorithm includes resolving the ICA permutation ambiguity, assigning the mode factors to the correct tensor factors, and calculating the tensor factor weights $\lambda_n$. The solution is to use the $c_n$ mode factors which are common to both of the demixing operations to find the correct $a_n$ mode assignments. The algorithm searches for the best matches of the $c_n$ mode factors between the two demixings for each of the R tensor mode factors. The $a_n$ associated with the matching $c_n$ is then assigned to the tensor factor with the matching $c_n$ and its associated $b_n$. This requires only RD(D−1) vector matching operations instead of R!, where R and D are the tensor rank and order, respectively, which is a huge reduction in computational complexity for high rank tensors.

Once the mode factors have been correctly assigned, the tensor weight factors $\lambda_n$ can be calculated by setting up a system of linear equations using a subset of the measured tensor values and solving for the $\lambda_n$. The subset can be selected randomly or using importance-weighted sampling methods.

Figure 7:
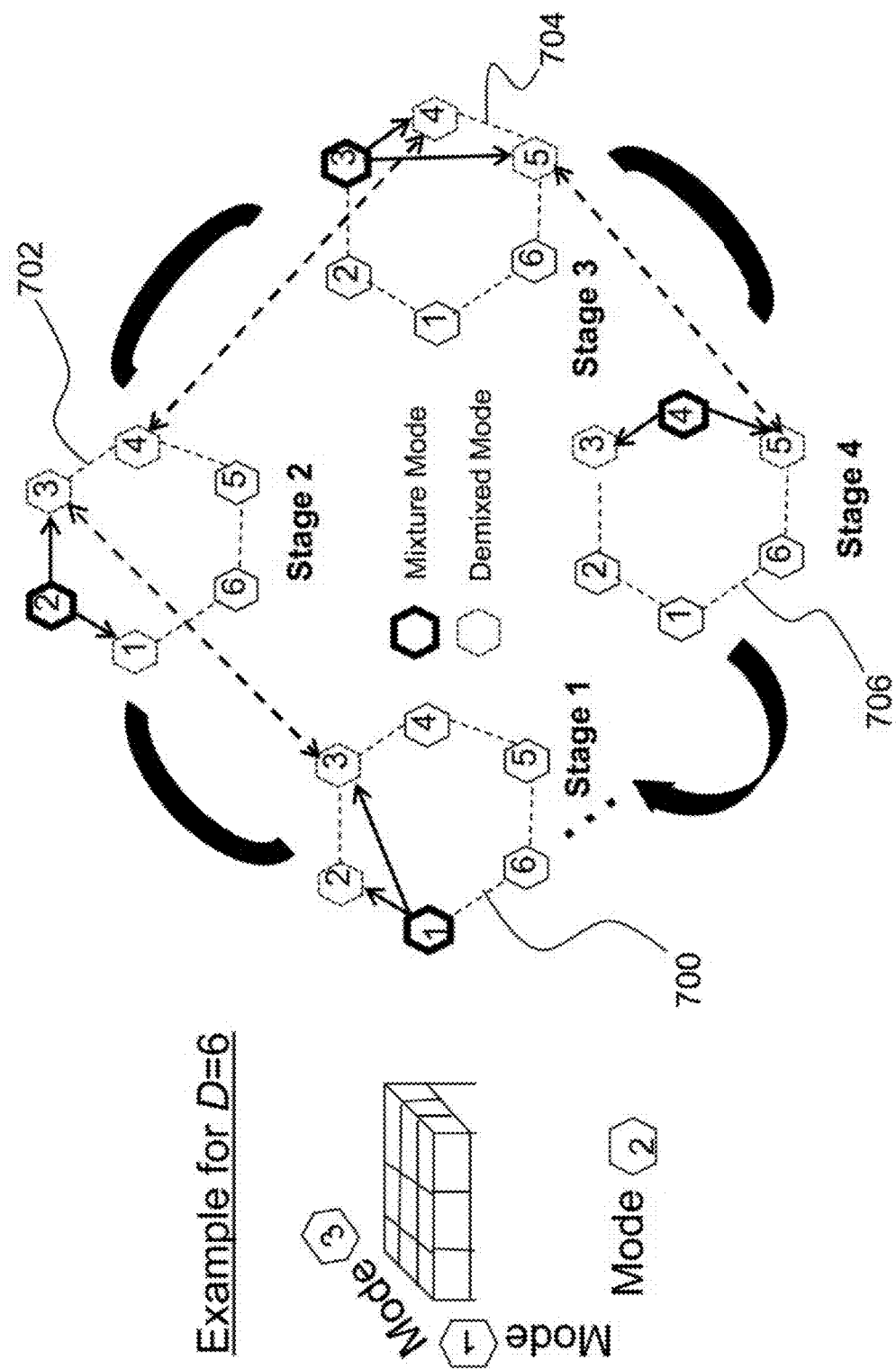
FIG. 7 is an illustration of an extension of ICAT chain demixing to tensors of arbitrary order according to some embodiments of the present disclosure.

This algorithm is easily generalizable to tensors of arbitrary order by traversing the loop shown in FIG. 7. In Stage 1 (element 700), mixture mode 1 is used to simultaneously demix factors for modes 2 and 3, which ensures they are correctly paired. In Stage 2 (element 702), mixture mode 2 is used to demix factors for modes 1 and 3. In Stage 3 (element 704), mixture mode 3 is used to demix factors for modes 4 and 5, and in Stage 4 (element 706), mixture mode 4 is used to demix factors for modes 3 and 5. By matching the mode 3 factors common to Stages 1 and 2, the associated mode 1 factors can be automatically assigned to the correct mode 2/mode 3 factor pairs.

For D-order tensors, pairs of modes are demixed in a sequence of stages using another mode as the mixing mode. Note that every stage has a demixed mode in common with the next stage. Since the demixed modes in each stage are demixed simultaneously because of the vectorization in Step 1, the correct mode factor combinations can be found by chain demixing and matching the common modes in stages around the loop (see FIG. 7). Only $D(D-1)$ mode factor match values need to be calculated compared to $D!$ for exhaustive search. The number of stages increases linearly with the order of the tensor. For $D>3$ it also possible to demix more than 2 modes at once, which can be advantageous if longer signal lengths are needed by ICA. By "closing the loop" after stage D and updating demixed modes by performing a weighted averaging of the previous and current mode estimates, self-consistency in the mode factors can be enforced, which improves the accuracy of reconstruction.

The ICAT tensor decomposition algorithm can be summarized as the following sequence of steps:

1. Measure Q tensor elements $d(i(p), j(p), k(p))$ where $p=1:Q$, where Q is much smaller than the total number of elements using random or importance-based sampling.
2. Reformat $d(i(p), j(p), k(p))$ into $N_{mix} \times Q$ matrix $d(i(m), q(p))$ where $i(m)$ is the mixture slice index, $a_n(i)$ are the mixture coefficients, and $q(p)$ is the signal index for the vectorized j-k tensor slice.
3. Run ICA or another BSS (blind source separation) algorithm on the signal mixtures and obtain the demixed vectorized sources $h_n(q(p))$ where $n=1:R$ and R is the rank of the tensor.
4. Reformat the vectors $h_n(q(p))$ back into matrices $hn(j(p), k(p))$.
5. Using a conventional non-negative matrix decomposition method such as 2D NLS, decompose each rank-1 2D matrix $h_n(j(p), k(p))$ into the outer product of two mode vectors $b_n(j)$ and $c_n(k)$ such that $h_n(j(p), k(p))=b_n(j) c_n(k)$. The $b_n(j)$ and $c_n(k)$ are then the mode factors for tensor factor n.
6. Repeat steps 2 to 5 using (m) as the mixture slice indices (where $m=1: N_{mix}$) and $b_n(j)$ as the mixing coefficients to calculate the mode factors $a_n(i)$ and $c_n(k)$. Note that the $c_n(k)$ mode factors are common to both demixings.
7. Find the best matching mode factors $c_n(k)$ from the demixings of $\{b_n(j), c_n(k)\}$ and $\{a_n(i), c_n(k)\}$ from Steps 5 and 6 to determine the correct combinations $\{a_n(i), b_n(j), c_n(k)\}$ to form the tensor factors using only $RD(D-1)$ tests instead of $R!$.
8. If the tensor has more than 3 modes, repeat above steps as shown on the next slide until all of the higher order mode factor combinations have been determined.
9. Repeat above procedure in a loop and adjust the mode factors until convergence (e.g. changes in the mode factors are less than a preset value).
10. Set up a system of linear equations as a matrix-vector multiplication by sampling the measured tensor values and solve it for the $\lambda_n$ values using the matrix pseudo-inverse.

The effectiveness of the ICAT algorithm has been demonstrated, and the results are summarized in FIGS. 3B, 3C, 8A, and 8B. As described above, FIGS. 3A and 3B show results for ICAT extraction of relevant signals from interference using the AReM dataset, which was collected from RF sensors worn by people doing different activities. The system described herein was able to reconstruct the tensor with 89% of the tensor missing, and walking and cycling signals were extracted from interference with 0.4% error. The Matlab execution time was 1.80 sec compared to 100 seconds for the SOA NLS algorithm implemented in TensorLab (a Matlab package for tensor computations). The ICAT tensor mode factor mean reconstruction error was 0.33% compared to 0.28% for NLS.

Figure 9:
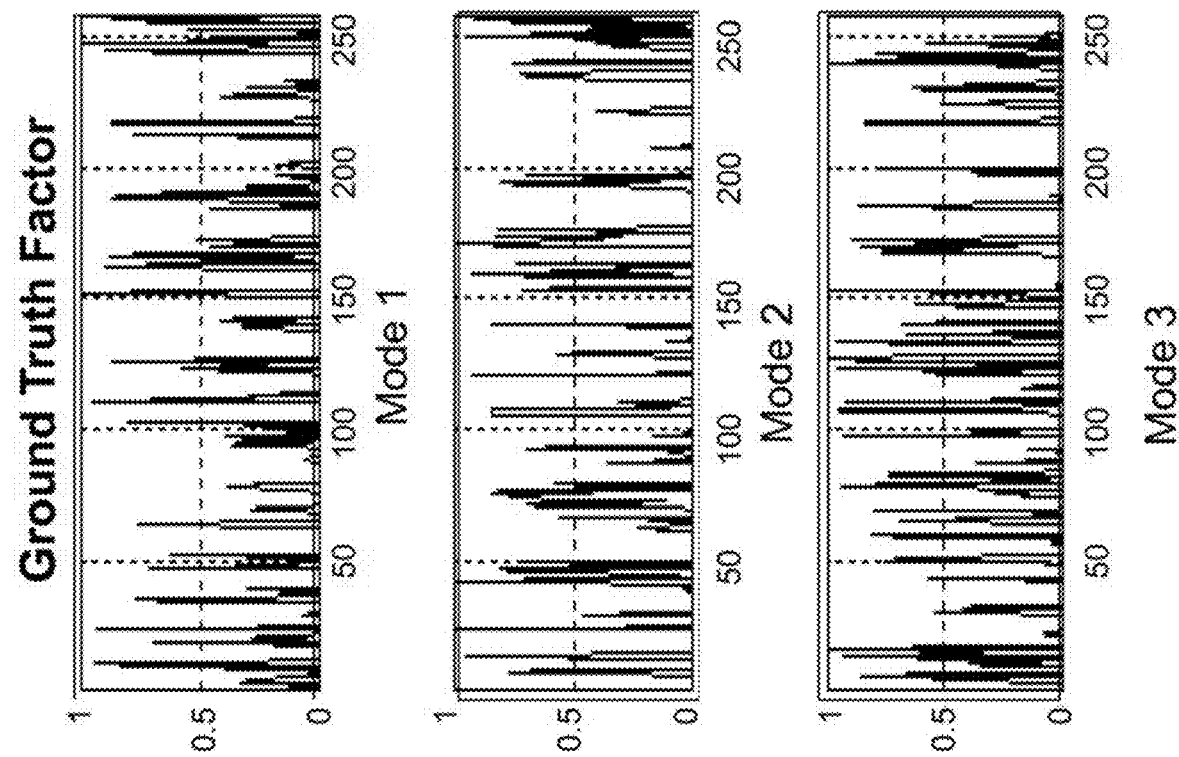
FIG. 9 is an illustration of examples of mode factors used to generate a third-order tensor of random spike data according to some embodiments of the present disclosure.

FIGS. 8A and 8B compare the tensor reconstruction errors (FIG. 8A) and execution times (FIG. 8B) of ICAT and NLS on synthetically generated data. These metrics were measured as functions of the number of horizontal and vertical slices sampled from the tensor. These results are for a 17 million element third-order tensor of random spiked data. The 256×256×256 tensor contained 17 million elements and was generated synthetically using mode factors consisting of multiple pulses with random values, widths, and separations. Examples of the mode factors are shown in FIG. 9. The tensor reconstruction error was expressed in terms of the Frobenius norm, which is an extension of root mean square (rms) error values to tensors. It is clear that for data that is even slightly subsampled, ICAT had a large speed advantage over NLS ranging from 47× to 16× while still having low reconstruction errors. NLS had an accuracy advantage for higher sampling rates, but the advantage disappeared when the data sampling was sufficiently sparse. It was necessary to add a small amount of noise to the data for NLS to converge, perhaps due to the slight sparsity of the data. ICAT performed well with or without the added noise.

In summary, the ICAT context-based sensor fusion and reconstruction framework can extract, denoise, and reconstruct data from incomplete sensor signals using a tensor representation that encodes relationships between signal signatures and different contextual conditions. For example, if the data being fused are spectral and spatial features from a hyperspectral camera, a contextual condition could be the time of day that the data was collected.

As noted above, the ICAT process described herein is much more efficient than SOA methods, especially for sparse tensors, and speedups >50× over the SOA have been demonstrated for tensors with 17 million elements. Unlike SOA methods, ICAT never needs to allocate memory for the full tensor and scales linearly with the tensor order rather than exponentially. These advantages make ICAT very suitable for real-time signal clean-up and extraction of signatures from multiple sensor data streams while incorporating contextual factors.

ICA has not been used for tensor decomposition before because of the indeterminate ordering and scaling of ICA outputs. ICA performs blind separation of signal mixtures into pure components based on the statistical independence of the components, but since the ordering and scaling of the output components is free to vary, the usual way ICA is used prevents combining the correct groups of ICA outputs into the individual tensor factors. The ICAT algorithm uses a novel sequence of ICA demixing stages for the tensor dimensions in which each pair of stages have a dimension in common. This enables the linking or matching of ICA components into the correct combinations for each tensor factor. The linking obviates the need for trying every possible combination of ICA outputs to find the correct one. Once the correct combinations have been determined, a simple system of linear equations can be solved to determine the correct scaling of each tensor factor.

ICAT can be applied to any sensing application which involves the fusion of multiple sensor data streams. For example, it is expected to be useful for fusion of the multiple sensors used in vehicles, including denoising of data, extraction of useful features, and reconstruction of missing data. For example, the missing or hidden data that is extracted can be detection and recognition of objects, such as vehicles, pedestrians, and traffic signs, under different weather conditions (e.g., rain, snow, fog) and lighting conditions (e.g., low light, bright light). The extracted hidden data can then be utilized to cause an automatic operation related to controlling a component of the autonomous vehicle.

Figure 10:
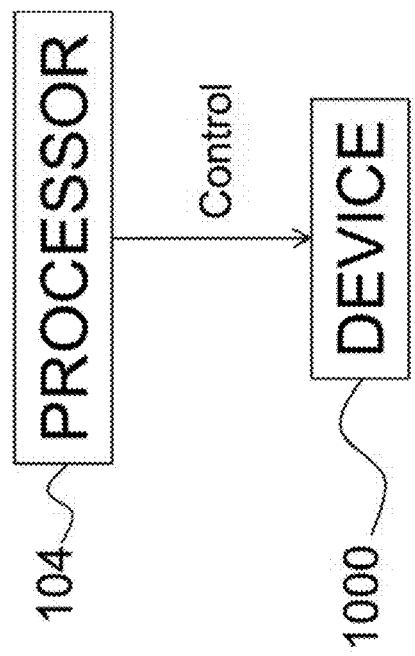
FIG. 10 is a flow diagram providing an illustration of controlling a device using the extracted hidden data.

FIG. 10 is a flow diagram illustrating using the processor 104 to control a device 1000 using the extracted hidden data. Non-limiting examples of devices 1000 that can be controlled via the processor 104 include a motor vehicle or a motor vehicle component (electrical, non-electrical, mechanical), such as a brake, a steering mechanism, suspension, or safety device (e.g., airbags, seatbelt tensioners, etc.). Further, the vehicle could be an unmanned aerial vehicle (UAV), an autonomous self-driving ground vehicle, or a human operated vehicle controlled either by a driver or by a remote operator. For instance, upon object detection (e.g., based on the hidden data) and recognition, the system can cause the autonomous vehicle to perform a driving operation/maneuver (such as steering or another command) in line with driving parameters in accordance with the recognized object. For example, if the system recognizes a bicyclist, another vehicle, or a pedestrian, the system described herein can cause a vehicle maneuver/operation to be performed to avoid a collision with the bicyclist or vehicle (or any other object that should be avoided while driving). The system can cause the autonomous vehicle to apply a functional movement response, such as a braking operation followed by a steering operation, to redirect vehicle away from the object, thereby avoiding a collision.

Other appropriate responses may include one or more of a steering operation, a throttle operation to increase speed or to decrease speed, or a decision to maintain course and speed without change. The responses may be appropriate for avoiding a collision, improving travel speed, or improving efficiency. As can be appreciated by one skilled in the art, control of other device types is also possible. Thus, there are a number of automated actions that can be initiated by the autonomous vehicle given the particular object detected and the circumstances in which the system is implemented. For instance, the method can be applied to border security (e.g., detecting smugglers at night), intelligence, surveillance, and reconnaissance (ISR), drones, autonomous vehicles, and perception and safety in autonomous systems (e.g., detecting humans interacting with robots in a manufacturing environment).

Another application of the invention described herein is fusion of multiple body-mounted sensors for human activities and conditions. Non-limiting examples of sensors include blood pressure sensors, pulse sensors, electromyogram (EMG) sensors, temperature sensors, electroencephalogram (EEG) sensors, accelerometers, gyroscopes, pedometers, and pressure sensors. For example, detection of activities from extracted hidden data, such as reduced rate of walking, combined with biometric measures, such as heart rates at certain times of the day, could be used to infer the health condition of a human. As an example, reduced movement combined with detected high blood pressure could indicate a potential stroke. Based on this detection, an text message, email, or audible alert could be sent to the human via a smartwatch, smartphone, or other mobile device. The message/alert can provide instructions to the human to go to the hospital or rest (e.g., sit down, lie down), for instance. In this example, the device 1000 controlled by the processor 104 that obtains the extracted hidden data according to embodiments of the present disclosure is a mobile device (smartwatch, smartphone, mobile phone) or personal computer comprising a display, and the display presents instructions for at least one action for the user to perform.

Finally, while this invention has been described in terms of several embodiments, one of ordinary skill in the art will readily recognize that the invention may have other applications in other environments. It should be noted that many embodiments and implementations are possible. Further, the following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means". Further, while particular method steps have been recited in a particular order, the method steps may occur in any desired order and fall within the scope of the present invention.

What is claimed is:

1. A system for sensor data fusion and reconstruction, the system comprising:
   one or more processors, and
   a non-transitory computer-readable medium having executable instructions encoded thereon such that when executed, the one or more processors perform operations of:
   (a) extracting slices from a tensor having a plurality of tensor modes, wherein each tensor mode represents a different sensor data stream of incomplete sensor signals from a plurality of body-worn human activity and biometric sensors;
   (b) demixing the tensor slices into demixed outputs;
   (c) converting the demixed outputs back into tensor slices, and decomposing the tensor slices into mode factors using matrix decomposition;
   repeating (a) through (c) until mode factors are determined for all of the tensor modes;
   assigning the mode factors to tensor factors by matching mode factors common to two or more demixings;
   using the assigned mode factors, determining tensor factor weight values;

using the tensor factor weight values, combine the tensor factors for sensor data reconstruction;

based on the sensor data reconstruction, extracting hidden sensor data from the body-worn human activity and biometric sensor signals;

detecting, in the extracted hidden sensor data, a human activity and a biometric measure;

inferring a human health condition based on the detected human activity and biometric measure; and generating and sending an alert related to the human health condition to a mobile device.

2. The system as set forth in claim 1, wherein memory requirements of the system scale linearly with a number of tensor modes.

3. The system as set forth in claim 1, wherein the tensor factor weight values are determined by setting up a system of linear equations using sensor data and solving for the tensor factor weight values.

4. The system as set forth in claim 1, wherein mode factors are adjusted until changes in the mode factors are less than a preset value.

5. The system as set forth in claim 1, wherein the tensor slices are processed via independent component analysis (ICA).

6. The system as set forth in claim 1, wherein the alert is sent to a user via the mobile device, wherein the alert comprises instructions for at least one action for the user to perform.

7. The system as set forth in claim 1, wherein the plurality of body-worn human activity and biometric sensors are selected from the group consisting of blood pressure sensors, pulse sensors, electromyogram sensors, temperature sensors, electroencephalogram sensors, accelerometers, gyroscopes, pedometers, and pressure sensors.

8. The system as set forth in claim 1, wherein the alert is one of a text message, an email, and an audible alert, and wherein the mobile device is one of a smartwatch and a smartphone.

9. A computer implemented method for sensor data fusion and reconstruction, the method comprising an act of:

causing one or more processors to execute instructions encoded on a non-transitory computer-readable medium, such that upon execution, the one or more processors perform operations of:

(a) extracting slices from a tensor having a plurality of tensor modes, wherein each tensor mode represents a different sensor data stream of incomplete sensor signals from a plurality of body-worn human activity and biometric sensors;

(b) demixing the tensor slices into demixed outputs;

(c) converting the demixed outputs back into tensor slices, and decomposing the tensor slices into mode factors using matrix decomposition;

repeating (a) through (c) until mode factors are determined for all of the tensor modes;

assigning the mode factors to tensor factors by matching mode factors common to two or more demixings;

using the assigned mode factors, determining tensor factor weight values;

using the tensor factor weight values, combine the tensor factors for sensor data reconstruction;

based on the sensor data reconstruction, extracting hidden sensor data from the body-worn human activity and biometric sensor signals;

detecting, in the extracted hidden sensor data, a human activity and a biometric measure;

inferring a human health condition based on the detected human activity and biometric measure; and generating and sending an alert related to the human health condition to a mobile device.

10. The method as set forth in claim 9, wherein the tensor factor weight values are determined by setting up a system of linear equations using sensor data and solving for the tensor factor weight values.

11. The method as set forth in claim 9, wherein mode factors are adjusted until changes in the mode factors are less than a preset value.

12. The method as set forth in claim 9, wherein the tensor slices are processed via independent component analysis (ICA).

13. A computer program product for sensor data fusion and reconstruction, the computer program product comprising:

computer-readable instructions stored on a non-transitory computer-readable medium that are executable by a computer having one or more processors for causing the processor to perform operations of:

(a) extracting slices from a tensor having a plurality of tensor modes, wherein each tensor mode represents a different sensor data stream of incomplete sensor signals from a plurality of body-worn human activity and biometric sensors;

(b) demixing the tensor slices into demixed outputs;

(c) converting the demixed outputs back into tensor slices, and decomposing the tensor slices into mode factors using matrix decomposition;

repeating (a) through (c) until mode factors are determined for all of the tensor modes;

assigning the mode factors to tensor factors by matching mode factors common to two or more demixings;

using the assigned mode factors, determining tensor factor weight values;

using the tensor factor weight values, combine the tensor factors for sensor data reconstruction;

based on the sensor data reconstruction, extracting hidden sensor data from the body-worn human activity and biometric sensor signals;

detecting, in the extracted hidden sensor data, a human activity and a biometric measure;

inferring a human health condition based on the detected human activity and biometric measure; and generating and sending an alert related to the human health condition to a mobile device.

14. The computer program product as set forth in claim 13, wherein the tensor factor weight values are determined by setting up a system of linear equations using sensor data and solving for the tensor factor weight values.

15. The computer program product as set forth in claim 13, wherein mode factors are adjusted until changes in the mode factors are less than a preset value.

16. The computer program product as set forth in claim 13, wherein the tensor slices are processed via independent component analysis (ICA).

* * * * *